UNITED STATES PATENT OFFICE.

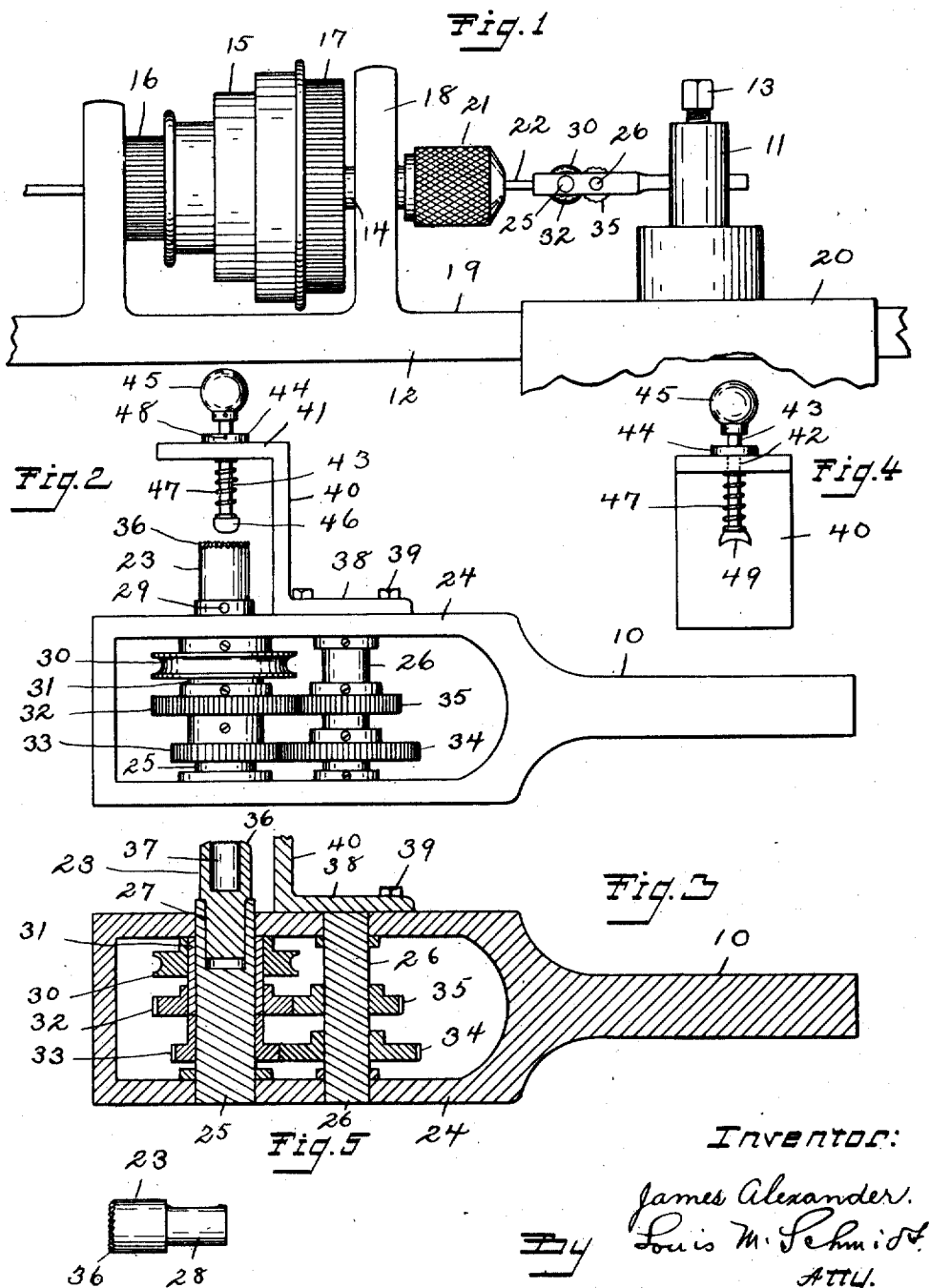

JAMES ALEXANDER, OF BRISTOL, CONNECTICUT.

TOOL FOR TURNING BALLS.

1,228,086. Specification of Letters Patent. Patented May 29, 1917.

Application filed May 1, 1916. Serial No. 94,670.

*To all whom it may concern:*

Be it known that I, JAMES ALEXANDER, a citizen of Great Britain, residing at Bristol, in the county of Hartford and State of Connecticut, have invented certain new and useful Improvements in Tools for Turning Balls, of which the following is a specification.

My invention relates to improvements in tools for turning balls, and the object of my improvement is to produce a tool that is adapted for use in coöperation with a lathe of ordinary construction for turning balls from bar stock.

In the accompanying drawing:—

Figure 1 is a side elevation of part of a lathe, with a piece of bar stock, and with my improved tool for turning balls supported by the tool post.

Fig. 2 is a plan view, on an enlarged scale, of the tool shown in Fig. 1.

Fig. 3 is a sectional view of part of the same.

Fig. 4 is an end elevation of the backing member.

Fig. 5 is a side elevation of the turning tool or cutter.

My improved tool for turning balls comprises a shank 10 by which it is supported from the tool post 11 of the lathe 12, being held in place by the binding screw 13 in an ordinary manner.

The said lathe 12 is ordinary, comprising a hollow spindle 14, on which are mounted the usual driving devices, such as the pulley cone 15 and the gears 16 and 17, the said spindle 14 being mounted in bearing standards 18 extending upwardly from the bed 19. On the said bed 19 is slidably mounted the carriage 20, which latter supports the tool post 11. The spindle 14 extends inwardly from the inner standard 18, and has mounted on the inner end the hollow chuck 21, which engages with the stock 22. The said stock 22 is in bar form, and extends through the spindle 14 and through the chuck 21, so that the extreme inner end is in position to be operated upon by the cutter 23 that is operatively supported by my improved tool.

The said tool comprises the shank 10 at one end, of suitable shape and dimensions to be received in the tool post 11, and connected therewith is an open frame having a pair of parallel side arms 24, in spaced relation. A pair of shafts are mounted in the said arms 24, comprising a main shaft 25 and a counter-shaft 26. The inner end of the main shaft 25 is provided with means for supporting the cutter 23 in axial alinement therewith. As shown the said shaft 25 has an axial bore 27 at the said inner end that is a fit for a reduced extension 28 on the said cutter 23, and a set-screw 29 serves to lock the cutter in position.

Between the arms 24 there is mounted driving mechanism for driving the main shaft 25 and the cutter 23 mounted thereon as follows:—

A grooved pulley 30 serves as the main driving member and is mounted on a sleeve 31, being rigidly connected thereto. The said sleeve 31 is rotatively mounted on the main shaft 25. A gear 32 is also rigidly mounted on the sleeve 31 and a second and smaller gear 33 is rigidly connected to the main shaft 25. On the counter-shaft 26 is mounted a pair of gears comprising a relatively large gear 34 for coöperating with the gear 33 and a smaller gear 35 for coöperating with the gear 32, the said gears 34 and 35 being rigidly connected to the counter-shaft 26. Thus means are provided for an increase of speed for the cutter 23 relatively to the driving pulley 30.

The cutter 23 comprises an annular cutting face 36 at the extreme inner end, the inner end portion being hollow, having an axial bore 37. The over-all diameter of the said cutting face 36 is somewhat greater than the diameter of the stock 22 to be operated upon and the diameter of the bore 37 corresponds precisely to the diameter of the ball to be turned.

Mounted on the inner arm 24 is a backing device to be described.

The said backing device comprises a bracket consisting of a base 38 with holes for the screws 39 by which it is secured to the arm 24 and an inwardly projecting arm 40. At the inner end of the arm 40 is a plate 41, parallel to the arm 24, and positioned opposite to the main shaft 25 and the cutter 23 and in spaced relation to the said cutter 23. In axial alinement with the main shaft 25 and cutter 23 is a bearing hole 42 in which is slidably mounted a rod 43. The rod 43 extends through the hole 42, has mounted on the rear end portion a collar 44 and at the extreme rear end a handle 45, has mounted on the extreme inner or front end a contact member 46, the said contact member 46 being slightly larger than the rod 43, and between the contact member 46 and the plate 41 is a spring 47. The collar 44 is adjustably mounted on the rod 43, being held in the desired position by the set-screw 48.

The spring 47 tends to position the rod 43 inwardly relatively to the plate 41 so that when not in use the collar 44 is held in contact with the plate 41. When in use the contact member 46 is held in contact with the stock 22 by the pressure of the spring 47, the amount of pressure being determined by the amount of off-set of the plate 41 relatively to the arm 24 and the strength of the spring.

The contact member 46 has preferably a concave contact face 49 for engaging with the stock 22.

In using my improved tool the stock is rotated in the lathe and the cutter is rotated by a belt operating on the grooved pulley. The cutter is fed inwardly and brought to bear against the stock, and at right angles thereto.

The backing member is brought into operative relation to the stock by pushing back the rod 43, in opposition to the spring 47, admitting the stock so that sufficient to make a ball is positioned in front of the contact face of the contact member, and then releasing the rod. Thus stock is positioned between the cutter and the contact member, and the said stock is backed up against the pressure of the cutter by a resilient pressure due to the operation of the spring of the backing member.

It is apparent that some changes from the specific construction herein disclosed may be made and therefore I do not wish to be understood as limiting myself to the precise form of construction shown and described, but desire the liberty to make such changes, in working my invention, as may fairly come within the spirit and scope of the claims.

I claim as my invention:—

1. A tool for turning balls comprising a holder having a shank for being received in the tool-post of a lathe, a shaft supported by the said holder, means for rotating the said shaft, and a cutter supported by one end of the said shaft, the said holder being a unitary structure, having a pair of parallel side arms connected to the said shaft and in spaced relation, and the said means for rotating the shaft comprising a pulley, mounted on the said shaft, and positioned between the said arms.

2. A tool suitable for use for turning balls comprising a holder having a shank and a pair of side arms connected to the said shank, a main shaft and a counter shaft supported by the said side arms, a cutter supported by one end of the said main shaft, a driving pulley rotatively mounted on the said main shaft, and gearing interconnecting the said pulley and main shaft, the said gearing comprising gears mounted on the said countershaft and coöperating gears mounted on the said main shaft consisting of a gear rotatively mounted thereon and connected to the said pulley and a second gear rigidly mounted thereon.

3. In combination, a tool for turning balls comprising a holder for being supported by the tool-post of a lathe, a shaft, means for turning the said shaft, and an annular cutter at one end of the said shaft, and a backing device for engaging with the stock operated on by the said cutter comprising a contact member and means for resiliently holding the said contact member in engagement with the said stock.

4. In combination, a tool for turning balls comprising a holder for being supported by the tool-post of a lathe, a shaft, means for turning the said shaft, and an annular cutter at one end of the said shaft, a backing device for engaging with the stock operated on by the said cutter comprising a contact member and means for resiliently holding the said contact member in engagement with the said stock, and means for supporting the said backing device from the said holder.

JAMES ALEXANDER.

Witnesses:
ALFRED L. THOMPSON,
LOUIS M. SCHMIDT.

Copies of this patent may be obtained for five cents each, by addressing the "Commissioner of Patents, Washington, D. C."